United States Patent
Hiromitsu

(10) Patent No.: US 8,518,597 B2
(45) Date of Patent: Aug. 27, 2013

(54) CATALYTIC LAYER-ELECTROLYTIC MEMBRANE ASSEMBLY, TRANSFER SHEET, AND PRODUCTION PROCESS THEREOF

(75) Inventor: Masashi Hiromitsu, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1320 days.

(21) Appl. No.: 12/007,629

(22) Filed: Jan. 14, 2008

(65) Prior Publication Data

US 2008/0187815 A1  Aug. 7, 2008

(30) Foreign Application Priority Data

Jan. 16, 2007  (JP) ................................ 2007-6822

(51) Int. Cl.
*H01M 8/10* (2006.01)
(52) U.S. Cl.
USPC ........... 429/483; 429/482; 429/492; 429/491; 429/493; 429/494
(58) Field of Classification Search
USPC ............... 429/479, 483, 492, 491, 529, 480, 429/481, 482, 493, 494
See application file for complete search history.

(56) References Cited

U.S. PATENT DOCUMENTS

| 6,579,639 B1 * | 6/2003 | Gyoten et al. | ............... 429/481 |
| 2002/0098407 A1 * | 7/2002 | Kunisa et al. | ................. 429/44 |
| 2006/0286422 A1 * | 12/2006 | Nakato et al. | ................. 429/30 |

FOREIGN PATENT DOCUMENTS

| JP | 11-503262 | 3/1999 |
| JP | 3698727 | 9/2005 |
| JP | 2006-032275 | 2/2006 |
| JP | 2006-032776 | 2/2006 |
| JP | 2006-155987 | 6/2006 |
| WO | WO 96/13073 | 5/1996 |
| WO | WO 96/13872 | 5/1996 |

* cited by examiner

*Primary Examiner* — Basia Ridley
*Assistant Examiner* — Heng Chan
(74) *Attorney, Agent, or Firm* — Kratz, Quintos & Hanson, LLP

(57) ABSTRACT

The present invention provides a catalytic layer-electrolytic membrane laminate for an unhumidified-type fuel cell, comprising an electrolytic membrane containing a strong acid; a conductive layer formed on one surface or both surfaces of the electrolytic membrane; and a catalytic layer formed on the conductive layer; wherein the conductive layer is formed of a fluorine-containing resin and carbon powder, and the conductive layer is thinner than the electrolytic membrane. The present invention provides a catalytic layer-electrolytic membrane laminate for an unhumidified-type fuel cell that can be practically used.

10 Claims, 2 Drawing Sheets

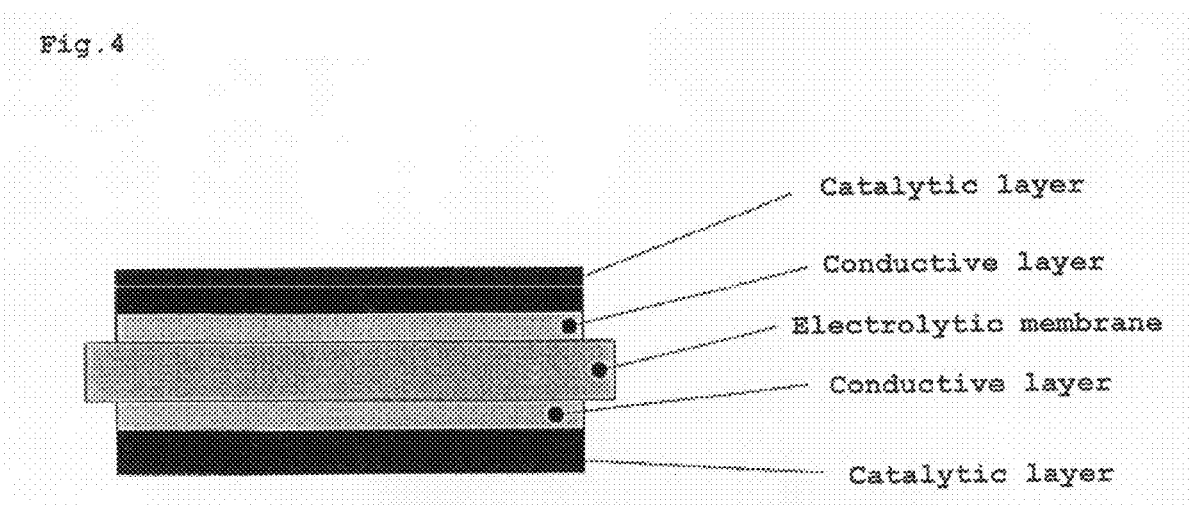

CATALYTIC LAYER-ELECTROLYTIC MEMBRANE ASSEMBLY, TRANSFER SHEET, AND PRODUCTION PROCESS THEREOF

TECHNICAL FIELD

The present invention relates to a catalytic layer-electrolytic membrane laminate, a transfer sheet and production methods of the catalytic layer-electrolytic membrane laminate and the transfer sheet. Specifically, the present invention relates to a catalytic layer-electrolytic membrane laminate for use in an unhumidified-type fuel cell, a transfer sheet for use in producing the laminate, and the methods for producing the same.

BACKGROUND ART

Various researches have been conducted on solid polymer-type fuel cells because solid polymer fuel cells can achieve reduced weight, high power density, etc., compared to other fuel cells. The solid polymer fuel cell comprises an ionic conductive polymer electrolyte membrane as its electrolytic membrane, a catalytic layer and an electrode substrate disposed on both surfaces of the electrolytic membrane in this order, and separators sandwiching the resulting laminate.

A solid polymer fuel cell ordinarily uses a cation conductive polymer electrolytic membrane, which transmits cations ($H^+$). Generally, a perfluorosulfonic acid resin that has a main chain comprising fluorinated alkylene and a side chain comprising fluorinated vinyl ether having a sulfonate group at its end is used. Such a polymer electrolytic membrane conducts sufficient ions for power generation by being impregnated with a suitable amount of water.

Therefore, in known solid polymer fuel cells, the moisture content in the polymer electrolytic membrane must be controlled, and this inevitably results in complicated and large-sized fuel cell systems.

In order to avoid the problems attributable to controlling the moisture content in the polymer electrolytic membrane, the use of an unhumidified electrolytic membrane, which allows the conduction of protons in an unhumidified condition, in place of known polymer electrolytic membranes has been proposed.

For example, Japanese Unexamined Patent Publication No. 1999-503262 discloses phosphoric acid-doped polybenzimidazole and like materials as examples of unhumidified polymer electrolytic membranes. However, in such unhumidified polymer electrolytic membranes, phosphoric acid or a like strong acid leaks with long-term operation, the open-circuit voltage lowers, and the cell resistance increases, which may adversely affect operating stability.

In order to solve such problems, a technique wherein a carbon layer is formed between an electrolytic membrane and a catalytic layer to retain electrolyte and prevent the transmission of a reaction gas, so that open-circuit voltage and cell resistance can be shifted in a stable manner (Japanese Unexamined Patent Publication No. 2006-32275).

In the technique disclosed in Japanese Unexamined Patent Publication No. 2006-32275, the carbon layer is made thicker than the electrolytic membrane in order to stabilize the solid polymer electrolytic membrane without increasing cell resistance (paragraph 0031 of Japanese Unexamined Patent Publication No. 2006-32275). To maintain the ion conductivity of the solid polymer electrolytic membrane for a long time, the carbon layer is additionally impregnated with a strong acid (paragraph 0030 of Japanese Unexamined Patent Publication No. 2006-32275). However, if the carbon layer is made thicker than the electrolytic membrane, the proton conductivity will be decreased. Furthermore, by additionally impregnating the carbon layer with a strong acid, gas diffusion is adversely affected by excessive acid. Therefore, the technique of Japanese Unexamined Patent Publication No. 2006-32275 has not yet been brought into practical use.

DISCLOSURE OF THE INVENTION

The present invention aims to solve the above problems and to provide a catalytic layer-electrolytic membrane laminate for an unhumidified-type fuel cell that can be practically used.

The present inventor conducted extensive research to solve the above problems and found that a catalytic layer-electrolytic membrane laminate for an unhumidified-type fuel cell that can be practically used is obtained by, in contrast with the technique disclosed in Japanese Unexamined Patent Publication No. 2006-32275, making the carbon layer remarkably thinner than the electrolytic membrane, and not forcibly impregnating the carbon layer with a strong acid. The present invention has been accomplished based on this finding.

The present invention provides a catalytic layer-electrolytic membrane laminate for an unhumidified-type fuel cell, a process for producing a laminate, a transfer sheet for producing the laminate, and a process for producing the transfer sheet as shown in Items 1 to 14 below.

Item 1. A catalytic layer-electrolytic membrane laminate for use in an unhumidified-type fuel cell, comprising:
  an electrolytic membrane containing a strong acid;
  a conductive layer formed on one surface or both surfaces of the electrolytic membrane; and
  a catalytic layer formed on the conductive layer;
  the conductive layer being formed of a fluorine-containing resin and carbon powder, and the conductive layer being thinner than the electrolytic membrane.

Item 2. A catalytic layer-electrolytic membrane laminate according to Item 1, wherein the thickness of the conductive layer is $1/200$ to $1/20$ that of the electrolytic membrane.

Item 3. A catalytic layer-electrolytic membrane laminate according to Item 1, wherein the thickness of the catalytic layer is $1/20$ to $1/4$ that of the electrolytic membrane.

Item 4. A catalytic layer-electrolytic membrane laminate according to Item 1, wherein the fluorine-containing resin forming the conductive layer is at least one member selected from the group consisting of polytetrafluoroethylene, tetrafluoroethylene/hexafluoropropylene copolymers, perfluoroethylene, polyvinylidene fluoride and perfluorosulfonic acid resins.

Item 5. A catalytic layer-electrolytic membrane laminate according to Item 1, wherein the conductive layer further comprises a non-polymeric fluoride.

Item 6. A catalytic layer-electrolytic membrane laminate according to Item 5, wherein the non-polymeric fluoride is at least one member selected from the group consisting of fluorinated pitch, fluorinated carbon, and fluorinated graphite.

Item 7. A catalytic layer-electrolytic membrane laminate according to Item 1, wherein the catalytic layer comprises a catalyst and a binder, and the binder is a fluorine-containing resin.

Item 8. A catalytic layer-electrolytic membrane laminate according to Item 7, wherein the fluorine-containing resin is at least one member selected from the group consisting of polytetrafluoroethylene, tetrafluoroethylene/hexafluoropropylene copolymers, perfluoroethylene, polyvinylidene fluoride and perfluorosulfonic acid resins.

Item 9. A catalytic layer-electrolytic membrane laminate according to Item 7, wherein the catalytic layer further comprises a non-polymeric fluoride.

Item 10. A catalytic layer-electrolytic membrane laminate according to Item 9, wherein the non-polymeric fluoride is at least one member selected from the group consisting of fluorinated pitch, fluorinated carbon, and fluorinated graphite.

Item 11. A process for producing the catalytic layer-electrolytic membrane laminate of Item 1 comprising the steps of:
preparing an ink for forming a conductive layer by mixing a fluorine-containing resin and carbon powder;
producing a sheet for forming a conductive layer by applying the ink for forming a conductive layer to a substrate;
preparing an ink for forming a catalytic layer by mixing a binder and a catalyst;
producing a sheet for forming a catalytic layer by applying the ink for forming a catalytic layer to a substrate;
transferring a conductive layer to one or both surfaces of an electrolytic membrane that contains a strong acid by heat pressing the sheet for forming a conductive layer; and
transferring a catalytic layer to the conductive layer formed on one or both surfaces of the electrolytic membrane that contains a strong acid by heat pressing the sheet for forming a catalytic layer.

Item 12. A process for producing the catalytic layer-electrolytic membrane laminate of Item 1 comprising the steps of:
preparing an ink for forming a catalytic layer by mixing a binder and a catalyst;
producing a sheet for forming a catalytic layer by applying the ink for forming a catalytic layer to a substrate;
preparing an ink for forming a conductive layer by mixing a fluorine-containing resin with carbon powder;
producing a sheet for forming a catalytic layer having a conductive layer by applying the ink for forming a conductive layer to the catalytic layer formed on the substrate; and
transferring a conductive layer and a catalytic layer to one or both surfaces of the electrolytic membrane that contains a strong acid by heat pressing the sheet for forming a catalytic layer with a conductive layer.

Item 13. A transfer sheet for producing a catalytic layer-electrolytic membrane laminate for use in the unhumidified-type fuel cell of Item 1 comprising:
a catalytic layer and a conductive layer formed on a substrate in the order of substrate/catalytic layer/conductive layer;
the catalytic layer comprising a binder and a catalyst; and
the conductive layer comprising a fluorine-containing resin and carbon powder.

Item 14. A process for obtaining a transfer sheet for producing a catalytic layer-electrolytic membrane laminate for use in the unhumidified-type fuel cell of Item 1 comprising the steps of:
preparing an ink for forming a catalytic layer by mixing a binder and a catalyst;
producing a sheet for forming a catalytic layer by applying the ink for forming a catalytic layer to a substrate;
preparing an ink for forming a conductive layer by mixing a fluorine-containing resin with carbon powder; and
producing a sheet for forming a catalytic layer having a conductive layer by applying the ink for forming a conductive layer to the catalytic layer formed on the substrate.

BEST MODE FOR CARRYING OUT THE INVENTION

The catalytic layer-electrolytic membrane laminate of the present invention is a catalytic layer-electrolytic membrane laminate for use in an unhumidified-type fuel cell, wherein a conductive layer is formed on one or both surfaces of an electrolytic membrane that contains a strong acid, and a catalytic layer is formed on the conductive layer.

Conductive Layer

The conductive layer comprises a fluorine-containing resin and carbon powder and is formed on one or both surfaces of the strong acid-containing electrolytic membrane.

Various types of carbon powder known in this field can be used, such as carbon black, carbon nanotube, and carbon wire.

The average particle diameter of the primary particles of carbon black is generally about 5 nm to about 100 nm, and preferably about 10 nm to about 85 nm. The aspect ratio (average fiber length/average fiber diameter) of the carbon nanotube and carbon wire is generally about 10 to about 100, and preferably about 30 to about 80. The average fiber length of the carbon nanotube and carbon wire is generally about 5 μm to about 200 μm, and preferably about 10 μm to about 100 μm. The average fiber diameter of the carbon nanotube and carbon wire is generally about 50 nm to about 500 nm, and preferably about 100 nm to 300 nm. The average particle diameter, average fiber length and average fiber diameter can be measured by visual inspection by, for example, magnified observation using an electron microscope, etc.

Various fluorine-containing resins known in this field can be used as the fluorine-containing resin of the present invention, such as polytetrafluoroethylene (PTFE), tetrafluoroethylene/hexafluoropropylene copolymers (FEP), tetrafluoroethylene/perfluoroalkylvinyl ether copolymers (PFA), polyvinylidene fluoride (PVDF) and perfluorosulfonic acid resins. These fluorine-containing resins may be used singly or in combination.

The weight average molecular weight of these fluorine-containing resins is preferably within the range of from 500 to 500,000, and more preferably from 1,000 to 400,000. The weight average molecular weight of the fluorine-containing resins can be measured by known methods, including gel permeation chromatography (GPC), etc.

The content of the fluorine-containing resin in the conductive layer is generally 0.1 part by weight to 5 parts by weight, and preferably 0.3 part by weight to 3 parts by weight per part by weight of the carbon powder in the conductive layer.

If the content of the fluorine-containing resin falls within the above range, the following effects can be achieved. That is, a conductive layer can be easily obtained, flooding caused by the water generated during the fuel cell reaction is not likely to occur, the power-generating ability of the cell will not be reduced, etc.

It is preferable that the conductive layer further comprise a non-polymeric fluoride. Examples of usable non-polymeric fluorides include various known non-polymeric fluorides, such as fluorinated pitch, fluorinated carbon, and fluorinated graphite. These non-polymeric fluorides may be used singly or in combination. Among these non-polymeric fluorides, fluorinated pitch is particularly preferable.

By adding these non-polymeric fluorides, it is possible to impart excellent conductivity and water repellency to the conductive layer. The non-polymeric fluoride has a higher conductivity than fluorine-containing resin and excellent water repellency. Therefore, desired components are added in accordance with the required functions. For example, if a binding property is required, a fluorine-containing resin is used, and if water repellency is required, a non-polymeric fluoride is added, etc. By adding a non-polymeric fluoride to the conductive layer, the amount of fluorine-containing resin can be reduced accordingly.

The content of the non-polymeric fluoride in the conductive layer is generally 0.05 part by weight to 1 part by weight, and preferably 0.1 part by weight to 0.5 part by weight per part by weight of carbon powder contained in the conductive layer.

When a non-polymeric fluoride is added to the conductive layer, the content of the fluorine-containing resin in the conductive layer is generally 0.09 part by weight to 4 parts by weight and preferably 0.25 part by weight to 2.5 parts by weight per part by weight of carbon powder contained in the conductive layer.

In the present invention, it is important that the conductive layer be thinner than the electrolytic membrane. The thickness of the conductive layer is preferably $1/200$ to $1/20$ that of the electrolytic membrane, and more preferably $1/100$ to $1/10$. If the ratio between the thickness of the conductive layer and that of the electrolytic membrane falls within the above range, the cell performance of the unhumidified-type fuel cell obtained by using the catalytic layer-electrolytic membrane laminate of the present invention can be stabilized for a long time without suffering from severe deterioration.

The thickness of the conductive layer is generally 1 μm to 50 μm and preferably 3 μm to 30 μm.

Catalytic Layer

A catalytic layer is formed on a conductive layer. The catalytic layer is formed from a catalyst and a binder.

Examples of usable catalysts include those known in this field, such as catalysts comprising platinum, a platinum compound or the like supported on carbon powder. Examples of platinum compounds include alloys containing platinum and at least one member selected from the group consisting of ruthenium, palladium, nickel, molybdenum, iridium, iron, and cobalt.

Examples of usable binders include fluorine-containing resins, etc.

The usable fluorine-containing resins include various fluorine-containing resins known in this field. Specific examples thereof include polytetrafluoroethylene, tetrafluoroethylene/hexafluoropropylene copolymers, perfluoroethylene, polyvinylidene fluoride, perfluorosulfonic acid resins, etc. These fluorine-containing resins may be used singly or in combination.

The weight average molecular weight of these fluorine-containing resins is preferably within the range of from 500 to 500,000, and more preferably from 1,000 to 400,000. The weight average molecular weight of the fluorine-containing resins can be measured by known methods, including gel permeation chromatography (GPC), etc.

The content of the fluorine-containing resin contained in the catalytic layer is generally 5 wt % to 60 wt %, and preferably 10 wt % to 40 wt % per total weight of the catalytic layer. The remaining portion is a catalyst. The content of the fluorine-containing resin contained in the catalytic layer is generally 0.5 part by weight to 5 parts by weight, and preferably 0.3 part by weight to 3 parts by weight per part by weight of carbon powder contained in the catalytic layer.

If the content of the fluorine-containing resin falls within the above range, several advantages can be attained, such as easy catalytic layer formation, flooding caused by the water generated during the fuel cell reaction is not likely to occur, and the power-generating ability of the cell will not be reduced.

It is more preferable that the catalytic layer further comprise a non-polymeric fluoride. Various known non-polymeric fluorides can be used as the non-polymeric fluoride of the present invention, such as fluorinated pitch, fluorinated carbon, fluorinated graphite, etc. These non-polymeric fluorides may be used singly or in combination. Among these non-polymeric fluorides, fluorinated pitch is particularly preferable.

By adding these non-polymeric fluorides, it is possible to impart excellent conductivity and water repellency to the catalytic layer. A non-polymeric fluoride has a higher conductivity than a fluorine-containing resin and excellent water repellency. Therefore, desired components are added in accordance with the required functions. For example, if a binding property is required, a fluorine-containing resin is used, and if water repellency is required, a non-polymeric fluoride is added, etc. By adding a non-polymeric fluoride to the catalytic layer, the amount of fluorine-containing resin can be reduced accordingly.

The content of the non-polymeric fluoride in the catalytic layer is generally 0.05 part by weight to 1 part by weight, and preferably 0.1 part by weight to 0.5 part by weight per part by weight of catalyst powder contained in the catalytic layer.

If a non-polymeric fluoride is added to the catalytic layer, the content of the fluorine-containing resin in the catalytic layer is generally 0.09 part by weight to 4 parts by weight and preferably 0.25 part by weight to 2.5 parts by weight per part by weigh of catalytic powder contained in the catalytic layer.

The thickness of the catalytic layer is preferably $1/20$ to $1/4$ that of the electrolytic membrane, and more preferably $1/16$ to $1/3$. If the ratio between the thickness of the catalytic layer and that of the electrolytic membrane falls within the above range, the cell performance of the unhumidified-type fuel cell obtained by using the catalytic layer-electrolytic membrane laminate of the present invention can be stabilized for a long time without suffering from severe deterioration.

The thickness of the catalytic layer is generally 10 μm to 50 μm and preferably 15 μm to 30 μm.

In the present invention, it is more preferable that the thickness of the conductive layer be set at $1/200$ to $1/20$ that of the electrolytic membrane and that the thickness of the catalytic layer be set at $1/20$ to $1/4$ that of the electrolytic membrane. It is particularly preferable that the thickness of the conductive layer be set at $1/100$ to $1/10$ that of the electrolytic membrane and that the thickness of the catalytic layer be set at $1/16$ to $1/3$ that of the electrolytic membrane.

Electrolytic Membrane

The polymer electrolytic membrane of the present invention contains a basic polymer and a strong acid.

Various basic polymers known in this field can be used. Examples of preferable basic polymers include polybenzimidazoles, poly(pyridine)s, poly(pyrimidine)s, polyimidazoles, polybenzothiazoles, polybenzoxazoles, polyoxadiazoles, polyquinolines, polyquinoxalines, polythiadiazoles, polyoxazoles, polythiazoles, polyvinylpyridines, poly vinylimidazoles, etc. Among these, polybenzimidazoles are particularly preferable.

The weight average molecular weight of the basic polymer is preferably in the range of 1,000 to 1,000,000 and more preferably 200,000 to 500,000 in view of the mechanical strength, viscosity and other polymer characteristics, ease of formation, etc. The weight average molecular weight of the basic polymer can be measured by known methods, including gel permeation chromatography (GPC), etc.

It is preferable that the basic polymer be able to form a complex with a strong acid, and it is particularly preferable that the complex be a powder. From the viewpoint of easy formation, durability, and manufacturing costs, the volume average particle diameter of the powder complex between a basic polymer and an acid is preferably 10 μm to 100 μm, and more preferably 15 μm to 75 μm.

Examples of usable strong acids include phosphoric acid, sulfuric acid and like inorganic acids. If phosphoric acid is used as the strong acid, from the viewpoint of ion conductivity and ease of production, the concentration should preferably be about 85% to about 122% ($H_3PO_4$), and more preferably about 95% to about 110% ($H_3PO_4$).

The weight of the strong acid is preferably 5% to 99.9%, and more preferably 30% to 75% per total weight of the basic polymer and strong acid. If the weight of the strong acid falls within the above range, the ion conductivity is further improved and excellent abilities as a solid polymer electrolytic membrane can be attained.

The thickness of the electrolytic membrane is generally 10 μm to 400 μm, and preferably 200 μm to 350 μm.

Catalytic Layer-Electrolytic Membrane Laminate

In the catalytic layer-electrolytic membrane laminate of the present invention, a conductive layer is formed on one or both surfaces of the electrolytic membrane, and a catalytic layer is formed on the conductive layer.

In the catalytic layer-electrolytic membrane laminate, because the conductive layer is remarkably thinner than the electrolytic membrane, a part of the strong acid contained in the electrolytic membrane may enter the conductive layer. In this case, the strong acid in the electrolytic membrane enters approximately more than ⅓ and, in some cases, more than ½ of the thickness of the conductive layer. The strong acid contained in the electrolytic membrane may also enter the catalytic layer, and, in this case, the degree of entry of the strong acid should not be greater than ¾ of the thickness of the catalytic layer, and preferably not greater than ⅓ thereof.

Production Method of Catalytic Layer-Electrolytic Membrane Laminate

The catalytic layer-electrolytic membrane laminate of the present invention can be produced by, for example, Method A and Method B described below.

(1) Method A:

Method A comprises the steps of:

preparing an ink for forming a conductive layer by mixing a fluorine-containing resin and carbon powder;

preparing a sheet for forming a conductive layer by applying the ink for forming a conductive layer to a substrate;

preparing an ink for forming a catalytic layer by mixing a binder and a catalyst;

preparing a sheet for forming a catalytic layer by applying the ink for forming a catalytic layer to a substrate;

transferring a conductive layer to one or both surfaces of an electrolytic membrane that contains a strong acid by heat pressing a sheet for forming a conductive layer; and transferring a catalytic layer to the conductive layer formed on one or both surfaces of the electrolytic membrane that contains a strong acid by heat pressing a sheet for forming a catalytic layer.

In mixing the fluorine-containing resin with the carbon powder to obtain an ink for forming a conductive layer, various known methods can be employed.

Also, in mixing the binder with the catalyst to obtain an ink for forming a catalytic layer, various known methods can be employed.

The methods for applying the ink for forming a conductive layer or the ink for forming a catalytic layer to the substrate include various known methods, such as knife coating, bar-coating, spraying, dip coating, spin coating, roll coating, die coating, curtain coating, and screen printing.

Usable materials for the substrate include a large number of those known in this field, such as polyimide, polyethylene terephthalate, polyparabaric acid aramid, polyamide (nylon), polysulfone, polyethersulfone, polyphenylene polyphenylene sulfide, polyether ether ketone, polyetherimide, polyarylate, polyethylene naphthalate and like polymer films.

It is also possible to use ethylene tetrafluoroethylene copolymers (ETFE), tetrafluoroethylene/hexafluoropropylene copolymers (FEP), tetrafluoroethylene/perfluoroalkyl vinyl ether copolymers (PFA), polytetrafluoroethylene (PTFE) and like heat-resistant fluorine-containing resins.

The substrate may be, in addition to polymer film, art paper, coated paper, lightweight coated paper and like coated papers; and note paper, copy paper and like non-coated papers. The substrate may also be a sheet formed from carbon fiber, such as carbon cloth and carbon paper.

The thickness of the substrate is generally about 20 μm to about 150 μm, and preferably about 25 μm to about 50 μm in view of handling ease and cost effectiveness.

Therefore, polymer film, which is inexpensive and easily available, is preferable as the substrate, and polyethylene terephthalate or the like is particularly preferable.

In transferring the conductive layer to one or both surfaces of the electrolytic membrane, and transferring the catalytic layer to the conductive layer, heat pressing is preferably employed. The transferring temperature is preferably 120° C. to 200° C., and more preferably 130° C. to 180° C. in order to satisfactorily conduct transferring and to prevent deterioration of the electrolytic membrane and the catalytic layer.

The transferring pressure is preferably 0.1 Mpa to 10 Mpa, and more preferably 0.3 Mpa to 5 Mpa in order to satisfactorily conduct transferring, maintain the shapes of the electrolytic membrane and the catalytic layer, and prevent deterioration of the power-generating ability of the cell.

(2) Method B:

Method B comprises the steps of:

preparing an ink for forming a catalytic layer by mixing a binder and a catalyst;

preparing a sheet for forming a catalytic layer by applying the ink for forming a catalytic layer to a substrate;

preparing an ink for forming a conductive layer by mixing a fluorine-containing resin with carbon powder;

preparing a sheet for forming a catalytic layer with a conductive layer by applying the ink for forming a conductive layer to the catalytic layer formed on the substrate; and transferring a conductive layer and a catalytic layer to one or both surfaces of the electrolytic membrane that contains a strong acid by heat pressing a sheet for forming a catalytic layer with a conductive layer.

This series of steps can be conducted under the same conditions as those of Method A described above.

Sheet for Forming Catalytic Layer with Conductive Layer

The sheet for forming a catalytic layer with a conductive layer used in Method B is explained below.

The sheet for forming a catalytic layer with a conductive layer is used as a transfer sheet for forming a catalytic layer-electrolytic membrane laminate for use in an unhumidified-type fuel cell.

The sheet for forming a catalytic layer with a conductive layer comprises a catalytic layer and a conductive layer formed on the substrate in the order of substrate/catalytic layer/conductive layer, wherein the catalytic layer is formed from a binder and a catalyst, and the conductive layer is formed from a fluorine-containing resin and carbon powder.

The sheet for forming a catalytic layer with a conductive layer is produced, for example, during the production of the catalytic layer-electrolytic membrane laminate in Method B. In other words, the sheet for forming a catalytic layer with a conductive layer is formed through the step of preparing an ink for forming a catalytic layer by mixing a binder with a catalyst; the step of producing a sheet for forming a catalytic layer by applying the ink for forming a catalytic layer to a substrate; and the step of preparing an ink for forming a conductive layer by mixing a fluorine-containing resin with carbon powder.

EFFECT OF THE INVENTION

The present invention provides a catalytic layer-electrolytic membrane laminate for use in an unhumidified-type fuel cell that is suitable for practical use.

The catalytic layer-electrolytic membrane laminate of the present invention can provide long-term stability for the open-circuit voltage of a fuel cell that uses an electrolytic membrane for ion conduction in an unhumidified condition.

BRIEF DESCRIPTION OF THE DRAWINGS

FIG. 4 is a sectional view of one example of a catalytic layer-electrolytic membrane laminate of the present invention.

EXAMPLES

Figure 1:
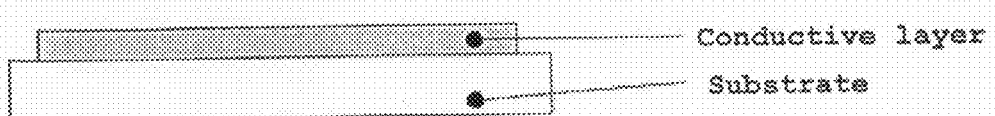
FIG. 1 is a sectional view of one example of a sheet for forming a conductive layer.
Figure 2:
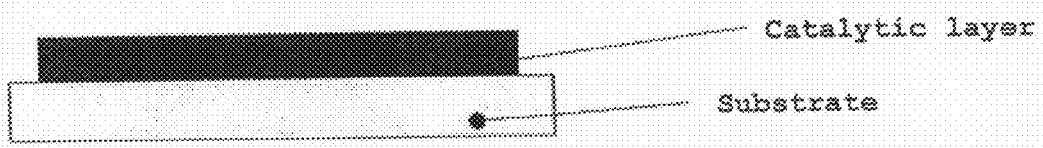
FIG. 2 is a sectional view of one example of a sheet for forming a catalytic layer.
Figure 3:
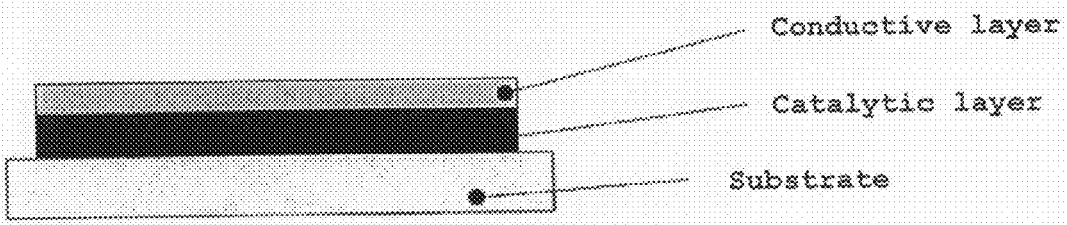
FIG. 3 is a sectional view of one example of a sheet for forming a catalytic layer with a conductive layer.

The present invention is explained in more detail with reference to Examples.

Example 1

(1) Production of Conductive Layer Film for Transfer Use

To 10 g of carbon black (Ketjen E C, produced by Kao Corporation) were added 25 g of 1-butanol, 25 g of 3-butanol and 8.3 g of 60 wt % PTFE water dispersion (produced by Sigma-Aldrich Co., solvent:water). The mixture was blended while agitating using a dispersion device, to obtain an ink for forming a conductive layer.

Subsequently, the ink for forming a conductive layer was applied to a surface of a polyester film (produced by Toyobo Co., Ltd., E5100, thickness: 25 μm) in such a manner that the weight of the conductive layer after drying became 0.3 mg/cm². Thus the conductive layer film for transfer use was produced. The thickness of the conductive layer was 5 μm.

(2) Production of Catalytic Layer Film for Transfer Use

To 10 g of platinum catalyst-supporting carbon (Pt: 46.5 wt %, produced by Tanaka Kikinzoku Kogyo K.K., TEC10E50E) were then added 25 g of 1-butanol, 25 g of 3-butanol and 8.3 g of 60 wt % PTFE water dispersion (produced by Sigma-Aldrich Co., solvent:water). The mixture was blended while agitating using a dispersion device, to obtain an ink for forming a catalytic layer.

Subsequently, the ink for forming a catalytic layer was applied to a surface of a polyester film (produced by Toyobo Co., Ltd., E5100, thickness: 25 μm) in such a manner that the weight of the platinum after drying was 0.8 mg/cm². Thus the catalytic layer film for transfer use was obtained. The thickness of the catalytic layer was 20 μm.

(3) Production of Electrolytic Membrane

To 90 g of N,N'-dimethylacetamide was added 10 g of PBI (weight average molecular weight of about 70,000), yielding a 10 wt % PBI solution. To 90 g of 115% phosphoric acid placed in a 200-ml beaker was gradually added 100 g of 10 wt % PBI solution while stirring at room temperature. The thus-obtained mixture was dried for 2 to 3 days at 170° C., and then the remaining N,N'-dimethylacetamide was removed. Subsequently, a solid matter containing PBI and phosphoric acid was formed into a powder using a jet mill. The volume average particle diameter of the obtained powder, measured using a particle size distribution analyzer, was 50 μm.

Then, 15 g of powder containing the PBI and phosphoric acid obtained in the above step and 3 g of PTFE were subjected to wet blending at room temperature. The thus-obtained mixture was rolled using a rolling mill so as to obtain a sheet having a thickness of 320 μm. The sheet was dried at 120° C. for 2 hours to remove the remaining solvent, yielding a solid polymer electrolytic membrane.

(4) Catalytic Layer-Electrolytic Membrane Laminate

The electrolytic membrane obtained above was cut into pieces each having a size of 35 mm×35 mm. On both surfaces of the electrolytic membrane, two 30 mm×30 mm pieces of conductive layer film for transfer use were placed in such a manner that the conductive layer faced the electrolytic membrane, and were then subjected to heat pressing. Thus, conductive layers were formed on both surfaces of the electrolytic membrane. The heat pressing was conducted at 130° C. and 0.2 MPa for 60 seconds.

Subsequently, two catalytic layer films for transfer use having a size of 30 mm×30 mm were formed on the conductive layers formed on both surfaces of the electrolytic membrane in such a manner that the catalytic layer faced the electrolytic membrane, and subjected to heat pressing. Thus, catalytic layers were formed on both surfaces of the electrolytic membrane. The structure of the layers had the order of catalytic layer (20 μm)/conductive layer (5 μm)/electrolytic membrane (320 μm)/conductive layer (5 μm)/catalytic layer (20 μm).

The heat pressing was conducted at 130° C. and 0.2 MPa for 60 seconds, so that a catalytic layer-electrolytic membrane laminate of the present invention was produced.

Example 2

(1) Production of Catalytic Layer Film for Transfer Use with Conductive Layer

To 10 g of platinum catalyst-supporting carbon (Pt: 46.5 wt %, produced by Tanaka Kikinzoku Kogyo K.K., TEC10E50E) were added 25 g of 1-butanol, 25 g of 3-butanol and 8.3 g of 60 wt % PTFE water dispersion (produced by Sigma-Aldrich Co., solvent:water). The mixture was blended while agitating using a dispersion device, to obtain an ink for forming a catalytic layer.

Subsequently, the ink for forming a catalytic layer was applied to a surface of a polyester film (produced by Toyobo Co., Ltd., E5100, thickness: 25 μm) in such a manner that the weight of the platinum after drying became 0.8 mg/cm². Thus the catalytic layer film for transfer use was obtained. The thickness of the catalytic layer was 20 μm.

To 10 g of carbon black (Ketjen E C, produced by Kao Corporation) were then added 25 g of 1-butanol, 25 g of 3-butanol and 8.3 g of 60 wt % PTFE water dispersion (produced by Sigma-Aldrich Co., solvent:water). The mixture was blended while agitating using a dispersion device, to obtain an ink for forming a conductive layer.

Subsequently, the ink for forming a conductive layer was applied to a surface of a polyester film (produced by Toyobo Co., Ltd., E5100, thickness: 25 μm) in such a manner that the weight of the conductive layer after drying became 0.3 mg/cm². Thus, a catalytic layer film for transfer use with conductive layer was produced. The thickness of the film was 25 μm (catalytic layer: 20 μm, conductive layer: 5 μm).

(2) Catalytic Layer-Electrolytic Membrane Laminate

The electrolytic membrane obtained in Example 1 was cut into pieces each having a size of 35 mm×35 mm, and two catalytic layer films for transfer use with conductive layer each having a size of 30 mm×30 mm were disposed on both surfaces of the electrolytic membrane in such a manner that the conductive layers faced the electrolytic membrane. Heat pressing was conducted at 130° C. and 0.2 MPa for 60 seconds so that a conductive layer and a catalytic layer were formed on each surface of the electrolytic membrane. Thus the catalytic layer-electrolytic membrane laminate of the present invention was obtained. The thus-obtained laminate had a structure with the order of catalytic layer (20 μm)/conductive layer (5 μm)/electrolytic membrane (320 μm)/conductive layer (5 μm)/catalytic layer (20 μm).

Example 3

(1) Production of Catalytic Layer Film for Transfer Use with Conductive Layer

To 10 g of platinum catalyst-supporting carbon (Pt: 46.5 wt %, produced by Tanaka Kikinzoku Kogyo K.K., TEC10E50E) were then added 30 g of distilled water, 25 g of 1-butanol, 25 g of 3-butanol, 50 g of 5 wt % nafion solution (produced by Dupont, solvent:isopropyl alcohol and water), and 3.5 g of fluorinated pitch. The mixture was blended while agitating using a dispersion device, to obtain an ink for forming a catalytic layer.

Subsequently, the ink for forming a catalytic layer was applied to a surface of a polyester film (produced by Toyobo Co., Ltd., E5100, thickness: 25 μm) in such a manner that the weight of the platinum after drying became 0.8 mg/cm$^2$. Thus, a catalytic layer film for transfer use was obtained. The thickness of the catalytic layer was 18 μm.

To 10 g of carbon black (Ketjen E C, produced by Kao Corporation) were then added 25 g of 1-butanol, 25 g of 3-butanol, 8.3 g of 60 wt % PTFE water dispersion (produced by Sigma-Aldrich Co., solvent:water), and 1 g of fluorinated pitch. The mixture was blended while agitating using a dispersion device, to obtain an ink for forming a conductive layer.

Subsequently, the ink for forming a conductive layer was applied to a surface of a polyester film (produced by Toyobo Co., Ltd., E5100, thickness: 25 μm) in such a manner that the weight of the conductive layer after drying became 0.3 mg/cm$^2$. Thus, a catalytic layer film for transfer use with conductive layer was produced. The thickness of the film was 22 μm (catalytic layer: 18 μm, conductive layer: 4 μm).

(2) Catalytic Layer-Electrolytic Membrane Laminate

The electrolytic membrane obtained in Example 1 was cut into pieces each having a size of 35 mm×35 mm, and two catalytic layer films for transfer use with conductive layer each having a size of 30 mm×30 mm were disposed on both surfaces of the electrolytic membrane in such a manner that the conductive layer faced the electrolytic membrane. Heat pressing was conducted at 130° C. and 0.2 MPa for 60 seconds so that a conductive layer and a catalytic layer were formed on each surface of the electrolytic membrane. Thus, the catalytic layer-electrolytic membrane laminate of the present invention was obtained. The thus-obtained laminate had a structure with the order of catalytic layer (18 μm)/conductive layer (2 μm)/electrolytic membrane (320 μm)/conductive layer (2 μm)/catalytic layer (18 μm).

Comparative Example 1

Without Conductive Layer

A catalytic layer-electrolytic membrane laminate was obtained by heat pressing a catalytic layer film for transfer use of Example 1 to each surface of the electrolytic membrane obtained in Example 1 at 130° C. and 0.2 MPa for 60 seconds.

Comparative Example 2

The Case Where the Conductive Layer is Thicker than the Electrolytic Membrane (1) Production of Conductive Layer Film for Transfer Use To 10 g of carbon black (Ketjen E C, produced by Kao Corporation) were added 10 g of water, 10 g of ethanol and 8.3 g of 60 wt % PTFE water dispersion (produced by Sigma-Aldrich Co., Solvent:water). The mixture was blended while agitating using a dispersion device to obtain an ink for forming a conductive layer.

Subsequently, the ink was applied to one surface of a polyester film (Toyobo Co., Ltd., E5100, thickness of 25 μm), and pressed using hard rollers so that the thickness of the conductive layer became 300 μm. Using the catalytic layer film for transfer use obtained in Example 1(2) and an electrolytic membrane (thickness of 300 μm) obtained in Example 1(3), a catalytic layer-electrolytic membrane laminate was produced in the same manner as in Example 1.

Test Example 1

The catalytic layer-electrolytic membrane assemblies obtained in Examples 1 and 2 and Comparative Examples 1 and 2 were placed in fuel cells and their open-circuit voltages (OCV) were measured.

The measurements were conducted under the conditions that the cell temperature was 160° C. and an unhumidified dry gas was supplied to the cells in such a manner that the air utilization became 40% and fuel utilization became 70%. The fuel cells were operated continuously, and the open-circuit voltages (OCV) after 300 hours and 500 hours were measured. Table 1 shows the results.

TABLE 1

| | Initial Stage | After 300 hours | After 500 hours |
|---|---|---|---|
| Example 1 | 850 | 845 | 840 |
| Example 2 | 850 | 865 | 860 |
| Example 3 | 860 | 855 | 855 |
| Comparative Example 1 | 850 | 800 | 770 |
| Comparative Example 2 | 860 | 830 | 800 |

As is clear from Table 1, when the catalytic layer-electrolytic membrane assemblies obtained in Examples 1 and 2 were incorporated in fuel cells, their open-circuit voltages (OCV) were stable for a long period of time.

The invention claimed is:

1. A catalytic layer-electrolytic membrane laminate for use in an unhumidified-type fuel cell, comprising:
    an electrolytic membrane containing a strong acid;
    a conductive layer formed on one surface or both surfaces of the electrolytic membrane; and
    a catalytic layer formed on the conductive layer;
    the conductive layer being formed of a first fluorine-containing resin and carbon powder, and the conductive layer being thinner than the electrolytic membrane,
    wherein the conductive layer further comprises a non-polymeric fluoride.

2. The catalytic layer-electrolytic membrane laminate according to claim 1, wherein the thickness of the conductive layer is 1/200 to 1/20 that of the electrolytic membrane.

3. The catalytic layer-electrolytic membrane laminate according to claim 1, wherein the thickness of the catalytic layer is 1/20 to 1/4 that of the electrolytic membrane.

4. The catalytic layer-electrolytic membrane laminate according to claim 1, wherein the fluorine-containing resin forming the conductive layer is at least one member selected from the group consisting of polytetrafluoroethylene, tetrafluoroethylene/hexafluoropropylene copolymers, perfluoroethylene, polyvinylidene fluoride and perfluorosulfonic acid resins.

5. The catalytic layer-electrolytic membrane laminate according to claim 1, wherein the content of the non-polymeric fluoride in the conductive layer is 0.05 to 1 part by weight relative to one part by weight of carbon powder contained in the conductive layer, and the content of the fluorine-containing resin in the conductive layer is 0.09 to 4 parts by weight relative to one part by weight of carbon powder contained in the conductive layer.

6. The catalytic layer-electrolytic membrane laminate according to claim 1, wherein the non-polymeric fluoride is at least one member selected from the group consisting of fluorinated pitch and either fluorinated carbon or fluorinated graphite.

7. The catalytic layer-electrolytic membrane laminate according to claim 1, wherein the catalytic layer comprises a catalyst and a binder, and the binder is a second fluorine-containing resin.

8. The catalytic layer-electrolytic membrane laminate according to claim 7, wherein the second fluorine-containing resin is at least one member selected from the group consisting of polytetrafluoroethylene, tetrafluoroethylene/hexafluoropropylene copolymers, perfluoroethylene, polyvinylidene fluoride and perfluorosulfonic acid resins.

9. The catalytic layer-electrolytic membrane laminate according to claim 7, wherein the catalytic layer further comprises a non-polymeric fluoride.

10. The catalytic layer-electrolytic membrane laminate according to claim 9, wherein the non-polymeric fluoride is at least one member selected from the group consisting of fluorinated pitch and either fluorinated carbon or fluorinated graphite.

* * * * *